United States Patent [19]

Cheng et al.

[11] 4,153,430
[45] May 8, 1979

[54] PROCESS AND APPARATUSES FOR CONTACTING A GAS PHASE AND A LIQUID PHASE

[76] Inventors: Chen-Yen Cheng; Yu-Ling Cheng; Wu-Cheng Cheng, all of 9605 La Playa St., NE., Albuquerque, N. Mex. 87111

[21] Appl. No.: 694,464

[22] Filed: Jun. 9, 1976

[51] Int. Cl.$^2$ .............................................. B01D 47/00
[52] U.S. Cl. .......................................... 55/84; 55/68; 55/244; 261/80; 261/92
[58] Field of Search .................. 210/150, 151; 261/80, 261/92, 125, 119 R; 55/232, 234, 84, 68, 244

[56] References Cited

U.S. PATENT DOCUMENTS

| | | | |
|---|---|---|---|
| 353,291 | 11/1886 | Denton | 261/80 |
| 372,178 | 10/1887 | Simpkin | 261/92 |
| 563,811 | 7/1896 | Scowden | 210/150 |
| 798,908 | 9/1905 | Kremer | 210/150 |
| 1,704,663 | 3/1929 | Noden | 261/92 |
| 1,971,796 | 8/1934 | Scott | 261/92 |
| 3,297,731 | 1/1967 | Hale | 23/270 B |
| 3,754,378 | 8/1973 | Christensen et al. | 261/92 |

*Primary Examiner*—Bernard Nozick

[57] ABSTRACT

This invention introduces a process and apparatuses for bringing a gas phase into contact with a liquid phase for an extended period of time and subjecting the phases to appropriate motions so as to accomplish efficient absorption and desorption operations and efficient pressurization and depressurization operations. The process is conducted in a processing system that comprises of many small compartments and a moving mechanism to which the compartments are attached. Each compartment has a confining wall to contain a mass of the feed gas and has an opening through which a liquid may be brought in contact with the gas to provide a gas-liquid interface. The processing system is submerged in the liquid phase and is divided into a first zone and a second zone; the compartments in the two zones are respectively subjected to a downward movement and an upward movement. The net force (buoyancy - gravity) that each zone of the system is subjected to is reduced by properly adjusting the amount of gas introduced in each compartment, distributing the masses of the confining walls of the compartments and the moving mechanism and by purposely adding weights and distributing the added weights. The upward motion and the downward motion of the two zones are coupled together through the moving mechanism so that the net forces applied to the two zones are balanced against each other. Thus, the two motions help each other to cut down the work input needed in the process.

4 Claims, 18 Drawing Figures

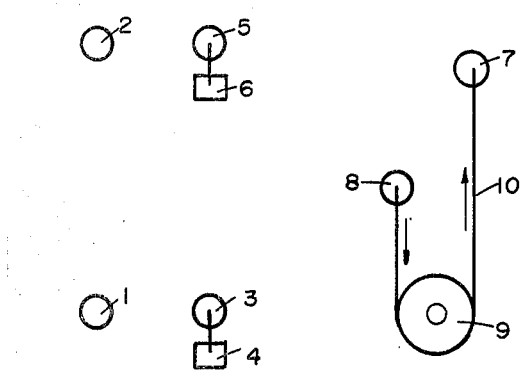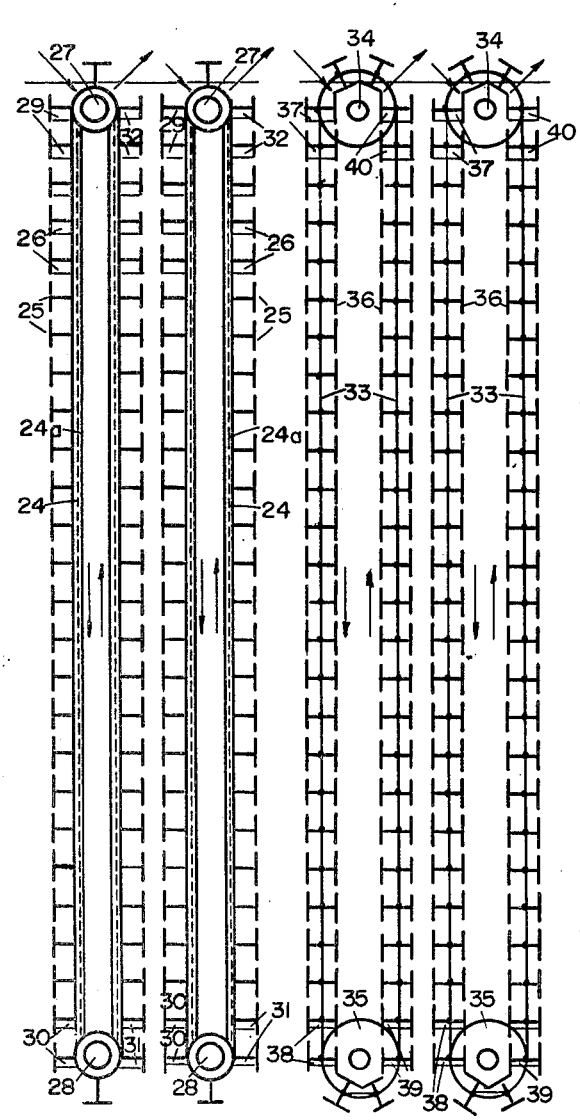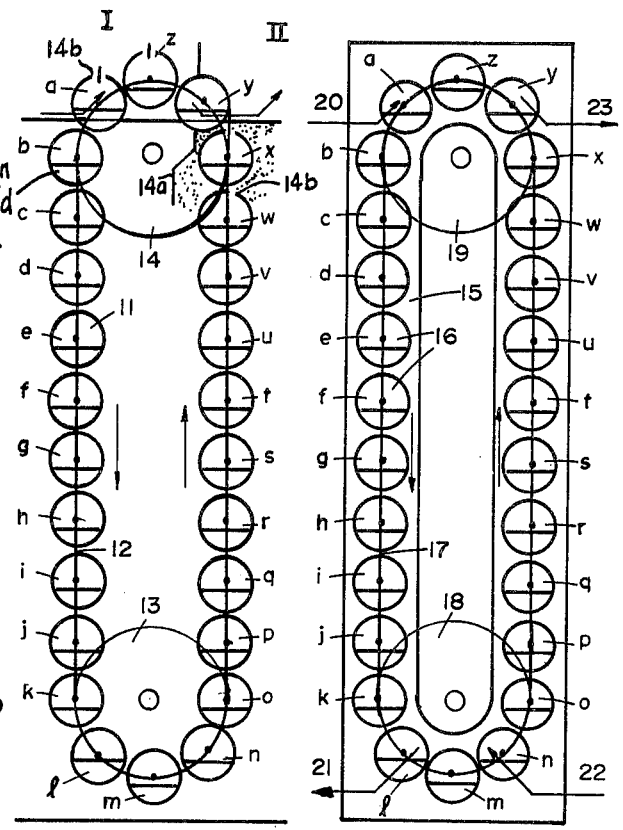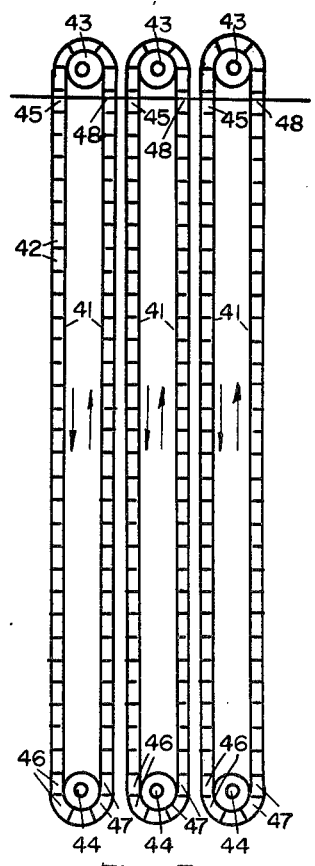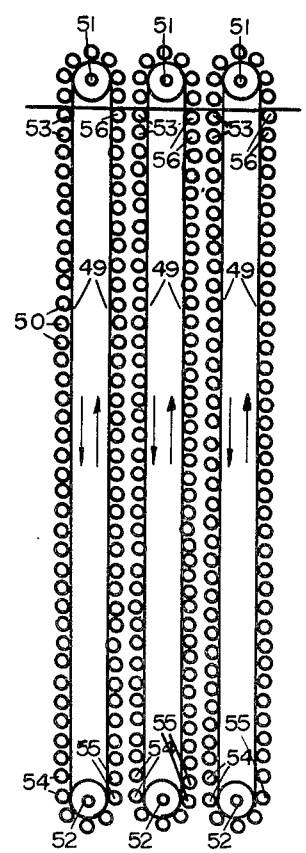

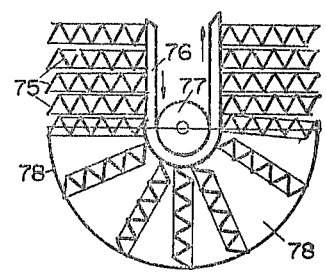
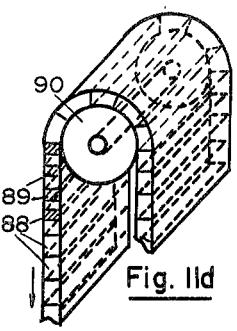
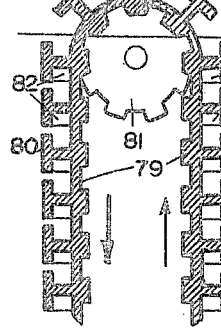
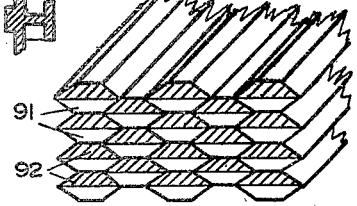
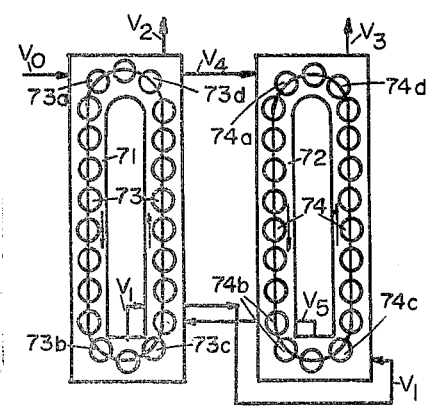

4,153,430

PROCESS AND APPARATUSES FOR CONTACTING A GAS PHASE AND A LIQUID PHASE

BACKGROUND OF THE INVENTION

1. Field of Invention

This invention relates to an efficient process and its associated apparatuses for contacting a gas phase with a liquid phase for an extended period of time and subjecting the two phases the appropriate motions. The characteristic features are (1) that the net forces that various parts of the processing system are subjected to are substantially reduced and balanced and (2) that the work input needed in the process is very low. The process may be used in (1) gas absorption operations, (2) gas desorption operations, (3) gas separations, (4) removal of suspensoids from gas streams, and (5) simultaneous pressurization and depressurization of gas streams.

2. Brief Description of the Prior Art

It has been described hat the process and apparatuses of the present invention may be used in the following applications:

(1) absorption of a gas into a liquid stream, (2) desorption of a gas from a liquid stream, (3) separation o a gas containing at least two components, A and B, into an A-enriched gas and a B-enriched gas by absorption and desorption operations.

(4) transferring suspensoids from a gas stream to a liquid stream, and (5) pressurization and depressurization of gas streams.

Equipments conventionally used for gas absorption and desorption operations are (a) tray columns such as bubble cap tray columns and sieve tray columns, (b) packed columns, (c) wetted wall columns. Mechanical surface aerators and sub-surface aerators have been used in dissolving oxygen from air to waste waters in activated sludge processes and U-tube aerators have been used in aerating streams. Tray columns and packed columns have been used in separating a gas mixture by absorption and desorption operations. Separation of a gas mixture has also been accomplished by adsorption-desorption operations by use of an adsorbent such as active carbon, silica gel and molecular sieves.

Suspensoids in a gas stream have been transferred to a liquid stream by a scrubbing operation by using (a) tray column scrubbers, (b) packed column scrubbers, (c) spray tower scrubbers, and (d) venturi scrubbers.

Pressurization of a gas stream is usually accomplished by use of blowers and compressors, which may be of a positive displacement type or a centrifugal type. Depressurization of a gas stream can be accomplished by use of an expanding turbine or a throttling valve.

BRIEF DESCRIPTION OF THE INVENTION

This invention introduces a process and apparatuses for bringing a gas phase into contact with a liquid phase for an extended period of time and subjecting the phases to appropriate motions so as to accomplish efficient absorption and desorption operations and efficient pressurization and depressurization operations. The processing system used in contacting a gas phase with a liquid phase is immersed in the liquid phase and has a first processing zone and a second processing zone. The system comprises of many small compartments that are attached to a moving mechanism such as a timing belt mechanism, a rotating chain mechanism or a rotating disc mechanism. The compartments that are in the first zone and the second zone are respectively subjected to a downward movement and an upward movement through the liquid phase. Each small compartment has a confining wall to contain a small amount of the gas and is made accessible to the liquid phase to provide contact area between the two phases. A small amount of the gas is introduced into a small compartment in the first zone, and the desired absorption and desorption operations and the pressurization and depressurization operations are conducted as the compartment moves first downward and then upward through the first zone and the second zone.

The work input needed in this process is reduced to a small amount by (1) reducing the net buoyancy-gravity force acting on the first zone and the net buoyancy-gravity force acting on the second zone, and (2) coupling the upward motion of the second zone with the downward motion of the first zone. The net buoyancy-gravity force acting on each zone can be adjusted by adjusting the amount of gas added to each compartment and by adding appropriate weights throughout the zones. The compartments in the two zones are coupled through the moving mechanism so that the upward motion of the second zone and the downward motion of the first zone balance each other and help each other.

BRIEF DESCRIPTION OF THE DRAWINGS

FIG. 1 illustrates the upward movement of a gas bubble suspended in a liquid phase and illustrates the buoyancy force and the lost work associated with its movement.

FIG. 2a illustrates that the bubble movement may be used to raise a weight that has been attached to the bubble.

FIG. 2b illustrates that an upward movement of the first bubble may be coupled with a downward movement of the second bubble.

FIG. 2a & 2b illustrates how work can be recovered from the movement of the bubble and the lost work thus reduced.

FIGS. 3 and 4 illustrate an outline of a processing system of the present invention. The shown that many small compartments containing gas and having gas-liquid interfaces are attached to a rotating belt and are subjected to downward movements and upward movements. FIG. 3 illustrates a system that is used in dissolving a gas into a liquid and FIG. 4 illustrates a system that is used in separating a gas mixture containing A and B into an A-enriched stream and a B-enriched stream. FIG. 4 also illustrates a system that is used in simultaneously pressurizing a gas stream and depressurizing another gas stream.

FIG. 5 illustrates a processing system with T-type compartments.

FIG. 6 illustrates a processing system with short H-type compartments.

FIG. 7 illustrates a processing system with rectangular compartments. and

FIG. 8 illustrates a processing system with small tubular compartments.

FIG. 9 illustrates a processing system having compartmentized blocks attached to a rotating mechanism.

FIG. 10 illustrates a processing system having compartments attached to rotating discs.

FIG. 10a shows left half and the right half are respectively the first and second zone of the system.

FIG. 11a–11e illustrates various types of small compartments and compartmentized blocks that may be used in the process. FIG. 11a show system which uses longitudinal wave-shaped pieces. FIG. 11b shows T-shaped pieces. FIG. 11c shows short H shaped pieces. FIG. 11d shows rectangular compartments. FIG. 11c shows hexagonal compartments.

FIG. 12 illustrates a proper way of recycling gas streams in a gas separation process in order to balance the net forces that the first zone and the second zone of the processing system are subjected to.

DESCRIPTION OF PREFERRED EMBODIMENT OF THE INVENTION

In describing the preferred embodiment of the invention, two examples will be frequently referred to: one is mass transfer of oxygen from air to waste water, and the other is the separation of an air stream into an oxygen-enriched stream and a nitrogen-enriched stream. Furthermore, in order to provide a proper basis for comparison, the performance of a typical conventional activated sludge process is first outlined. In a typical conventional activated sludge process for treating waste water, waste water is contained in a tank 10 to 15 feet in depth, and air is pressurized to 5–7 psi and dispersed as air bubbles 1 mm to 3 mm in diameter at the lower parts of the tank. Each bubble rises and bursts at the surface. An average bubble stays suspended for a period of 10 to 15 seconds. The major mass transfer resistance is on the liquid film side. Because of the smallness of the solubility of oxygen in water and because of the shortness of the contact time, only about 6 to 10% of the oxygen in the gas bubble is transferred to water. The dissolved oxygen concentration in waste water is about 2 ppm, while the saturation value is 9 ppm. The difference in the two concentrations provides the driving force for mass transfer in the water phase. The amount of oxygen transferred per horse-power of work spent in compressing the air is only 2 to 4 pounds. This value is very low. Since the fugacity of oxygen in air is higher than the fugacity of dissolved oxygen in water at 2 ppm concentration, useful work can be recovered in an ideal reversible transfer of oxygen from air to water. Therefore, there is no theoretical limit in increasing the amount of oxygen transferred per hp-hour of work spent. In other words, any work that is spent in transferring oxygen is work lost. It is important, therefore, to show how work is lost in a conventional gas-liquid contacting device and how useful work can be recovered. The present invention has originated from a clear analysis of the problems.

FIG. 1 illustrates the free rise 1, 2 of a bubble suspended in a liquid phase. The bubble is subjected to a net upward force because of the difference in the densities of the liquid phase and the gas phase. Letting the net upward force be $F_B$ and the vertical position be Z, the amount of work recoverable as the bubble rises from the first position $Z_1$ to the second position $Z_2$ is given by $$\int_{Z_1}^{Z_2} F_B dZ.$$

The net upward force $F_B$ the bubble receives is $$F_B = V_B(d_l - d_g)g/g_c$$

where $V_B$ is the volume of the bubble, $d_l$ and $d_g$ are respectively the densities of the liquid phase and the gas phase, g is the gravitational acceleration, and $g_c$ is the conversion factor for converting from poundal units to pound force units. No attempt has been made to recover this useful work in a conventional gas-liquid contacting operation. Because of this net upward force, a gas bubble rises in the liquid phase very rapidly, cutting down the contact time between the two phases. The net upward force will also be referred to as the net buoyancy-gravity force. A net-buoyancy-gravity force acting on a body is defined as the difference in the buoyancy force and the gravity force that act on the body.

There are two way by which useful work can be recovered from a rising bubble. These methods are respectively referred to as the method of reducing net upward force, or the first method, and the method of coupling rising and descending masses of gas, or the second method, and are respectively illustrated by FIGS. 2a and 2b.

FIG. 2a shows that a weight of mass $m_A$ and volume $V_A$ has been attached to a rising bubble of volume $V_B$. As the bubble rises from 3 to 5, the added weight rises from 4 to 6. The net upward force or net buoyancy-gravity force $F_c$ applied to the combined body of the bubble and the added weight is $$F_c = (V_A + V_B)d_l \cdot g/g_c - (m_A + V_B \cdot d_g)g/g_c$$

and is equal to $$F_c = V_B(d_l - d_g)g/g_c - (m_A - V_A \cdot d_l)g/g_c$$

where $V_B \cdot d_g$ is the mass of the gass bubble B.

It is seen that the net upward force $F_c$ applied to the combined body of the bubble and the added weight is less than the net upward force $F_B$ applied to the free rising bubble by the amount of $(m_A - V_A \cdot d_l)g/g_c$. By adding a weight of a proper mass, the $F_c$ value is reduced to a small positive value and the combined body rises slowly upward. Useful work is recovered from the rising bubble in the way of lifting the weight and the work recovered is $$(m_A - V_A \cdot d_l)(z_2 - Z_1)g/g_c$$

where $(Z_2 - Z_1)$ is the vertical rise of the combined body.

FIG. 2-b shows that a rising bubble 7 is connected to a descending bubble 8 by a wire 10 that passes through a pulley 9. When the net upward force acting on the first bubble 7, had it been a free bubble, is larger than the net upward force acting on the second bubble 8, had it been a free bubble, the first bubble 7 rises and the second bubble descends—the rise of the first bubble pulls the second bubble down. In other words, useful work is recovered from the first bubble and the work recovered is used in lowering the second bubble.

FIG. 3 illustrates a processing system that may be used in transferring one or more components from a gas stream to a liquid phase. An example is the transfer of oxygen from air to waste water. The system comprises of many small cylindrical compartments 11-a through 11-z, one or more moving belts or chains 12, and rotating pulleys or rotating gears 13 and 14. The two ends of each compartment are partially enclosed so that a mass of a gas can be contained therein, and a liquid can enter and leave the compartment through the openings provided at the two ends. A gas-liquid interface is therefore provided within each compartment. Each compartment is attached to the moving belts or chains by means of pivots. The processing system is submerged in a large pool of the liquid phase and each compartment is subjected first to a downward movement then an upward movement through the liquid phase. The processing system has a first processing zone and a second processing zone which are respectively the compartments 11-a through 11-l and the portion of the belts to which these compartments are attached, and the compartments 11-n through 11-y and the portion of the belts to which these compartments are attached. Compartments in the first zone are in a downward movement and compartments in the second zone are in an upward movement.

Let it be assumed that the system illustrated in FIG. 3 is used in contacting a feed gas containing A-component and B-component into a C-solvent so that A-component is preferentially dissolved in the solvent. As an example, the feed gas can be air, the A-component and the B-component can be oxygen and nitrogen, respectively, and the solvent can be water. It is seen in the figure that most of compartments 11-b through 11-x are submerged in the solvent phase. The feed gas in introduced into the compartment at the top position z. As this compartment is submerged into the solvent phase, some solvent enters the compartment through the openings on the side walls and a mass of the feed gas is confined within the compartments. Thus, a gas-liquid interface is established within the compartment. As this compartment moves downward through the first zone, A-component in the confined gas dissolves in the solvent. This dissolution is assisted by the increased hydraulic pressure during the descent. The compartment then enters the second zone and moves upward. Because of the decrease in pressure due to the reduced hydraulic head, the driving force for mass transfer decreases. However, when the concentration of the dissolved A-component in the solvent phase is sufficiently low throughout the system, absorption continues even throughout the second zone. This situation is assumed in the system of FIG. 3. This compartment finally emerges from the surface of the liquid pool and the undissolved gas is removed from the compartment at the upper end of the second zone. A mass of the feed gas is introduced at the upper end of the first zone and the operations described are repeated. A partition 14a may be provided to keep the initial gas stream and treated gas stream in region I and region II respectively. A method for removing gas from a compartment and a method for introducing gas into a compartment are also illustrated in FIG. 3. Referring to FIG. 3, one may provide a vent 14b on the top of each compartment. Vents on compartments at positions w, x, z and a are open and vents on compartments at positions b through v and y are closed. In order to increase mass transfer rate, one may circulate the solvent through each compartment as it moves through the system.

The tensile stresses developed in the moving mechanism 12 and forces applied to the pulleys or gears 13 and 14 can be reduced to small values by properly balancing the buoyancy forces and the gravity forces of these zones. The balancing can be assisted by purposely adding weights (not shown in the figure) and by properly distributing the weights so added. The work input to the system is reduced to a low value, because the upward motion in the second zone and the downward motion in the first zone are coupled together and the two movements assist each other in the way described earlier in connection with FIG. 2b.

FIG. 4 illustrates a processing system that may be used in separating a gas mixture containing at least two components A and B into an A-enriched stream and B-enriched stream by using a solvent C which has a higher affinity for A than B. The system comprises of a loop conduit 15, many small cylindrical compartments 16-a through 16-z, a moving mechanism 17 on which the compartments are attached by pivots and two pulleys or gears 18 and 19. A quantity of C-solvent is circulated in the loop conduit and all the compartments are submerged in the solvent phase. The constructions of the compartments, the equipment set-up and the operational procedures of this system are very similar to those of FIG. 3. However, there are some differences. Only these differences are emphasized in the following description in order to avoid repetition.

The system comprises of a first zone and a second zone which are respectively the part between points a and l and the part between points n and y. Gas absorption takes place within the first zone and gas desorption takes place within at least a part of the second zone. A rather limited amount of the solvent is circulated in the loop conduits so that the concentration of the dissolved A-component at the end of the first zone l is close to the saturation value that is in equilibrium with the gas phase at the point. A quantity of feed gas 20 is introduced to the compartment at the upper end a of the first zone. This compartment then moves downward in the first zone with the solvent stream. Component A is transferred from the gas phase in the compartment to the liquid phase. Thus, the A-component concentration in the liquid phase gradually increases. At the lower end of the first zone l, the undissolved gas 21 is removed from the compartment. The gas so removed is the B-enriched gas. Then both the liquid and the compartment reach the lower end n of the second zone. Here a quantity of A-enriched gas is introduced into the compartment in order to balance the net forces of the two zones and provide a gas-liquid interface within the compartment. As the compartment and the liquid phase move up in the second zone, A-component is desorbed from the liquid phase and enters the gas phase. The gas that exists in the compartment at the upper end y of the second zone is removed. The gas so removed is an A-enriched gas. A part of this gas is taken as a product and a part may be recycled to the lower end of the second zone in the way to be described in connection with FIG. 12. The compartment then enters the upper end of the first zone and the operations described are repeated.

The system illustrated by FIG. 5 uses T-shaped pieces and may be used in transferring one or more components from a gas stream to a liquid stream in a way similar to that described for the system of FIG. 3. The system may also be modified and be used in separating a gas mixture in a way similar to the way the system of FIG. 4 is related to the system of FIG. 3.

The figure shows two processing subsystems. Each subsystem comprises of a timing belt 24 with timing teeth 24a that are moved by two pulleys 27 and 28. Longitudinal pieces 25 with T-shaped cross-sections are attached to the timing belt so that the lower half of a given piece and the upper half of the next lower piece form a small longitudinal compartment 26. The spacing between two neighboring pieces provides an opening through which liquid can enter and leave the compartment formed by the two pieces. The front end and back end of each piece are closed by overlapping plates. Most parts of the belt are submerged in the liquid phase. The left half and right half of each subsystem are respectively the first zone and the second zone of the subsystem. Feed gas is introduced to the compartment at the upper end of the first zone. As this compartment is submerged into the liquid phase, a gas space 29 with a gas-liquid interface is formed in the compartment. As this compartment moves downward, the volume of the vapor space 30 decreases because of the transfer of gas components and because of the increased hydraulic head. The volume of the gas space may increase as the compartment moves up in the second zone 31 and 32. It is noted that the gas confined within a compartment remains confined in the compartment as it rotates around the lower pulley 28 due to two confining walls provided at the front end and the rear end in the vicinity of the pulley. Undissolved gas is discharged at the upper end of the second zone.

The system illustrates by FIG. 6 uses short H-shaped pieces to form small longitudinal compartments. Its set-up, its use and its operation are similar to those of the system illustrated by FIG. 5. The figure illustrates two sub-systems. Each subsystem comprises of one or more moving chains 33, two rotating gears 34 and 35, many longitudinal short H-shaped pieces 36. The lower half of a given piece and the upper half of the next lower piece form a compartment which confines a quantity of a gas and contains a gas-liquid interface. The opening between two pieces provide an opening through which the liquid phase is accessible to the compartment formed by the two pieces. The left half and the right half of each subsystem are respectively the first zone and the second zone of the subsystem. Feed gas is introduced to the compartment at the upper end of the first zone and the undissolved gas is discharged at the upper end of the second zone. The volume of the vapor space 37 and 38 in a compartment decreases as it descends in the first zone, and the volume 39 and 40 may increase as it ascends in the second zone. The gas confined within a given compartment is prevented from leaving the compartment as the compartment rotates around the lower gear 35 by two end walls provided in the vicinity of the gear.

FIG. 7 illustrates a processing system which utilizes compartmentized moving belts. It shows three subsystems; each has a compartmentized belt 41 provided with many longitudinal compartments 42 and two pulleys 43 and 44. The system may be used for a gas absorption operation or be modified and used in a gas separation operation. There are movable end covers provided at the front end and the rear end of each longitudinal compartment. Each end cover covers only a part of the end opening so that a quantity of gas can be confined in the compartment leaving an opening through which the liquid phase is accessible to the compartment. There are two disc-shaped covers at the front end and the rear end in the vicinity of the lower pulley to prevent gas from leaving a compartment as it rotates around the pulley. The operation and uses of this system are similar to those described in connection with FIGS. 3, 5 and 6, and are not repeated here.

FIG. 8 illustrates a processing system which has many small cylindrical tubes fixed on moving belts. The system differs from the system of FIG. 3 in that the cylindrical compartments are fixed on the belt rather than attached by pivots. The figure shows three subsystems; each having a moving belt 49, many cylindrical conduits 50, two pulleys 51 and 52. A movable cover is used to cover the upper part of the two end of each conduit and covering discs are provided in the vicinity of each lower pulley 52. The first zone and the second zone of each subsystem are respectively the left half, 53 through 54, and the right half, 55 through 56, of the subsystem. The operation and uses of this system are similar to those of the system of FIG. 7.

FIG. 9 shows a high capacity processing system which utilizes compartmentized blocks. The system as illustrated is used in separating a gas mixture. A modified system can be used in a gas absorption operation. Referring to the figure, the system comprises of an enclosed rectangular tank 56 which is partitioned by a wall 56a to form a looped conduit, many compartmentized blocks 57a through 57j, many shafts 58a through 58a, one for each compartmentized block, two rotating chains 59 and 60. The compartmentized blocks 58a through 58j are rotatably attached to the rotating chains by the shafts 58a through 58j. Each compartmentized block has many small rectangular compartments. The two ends of each small compartment are partly covered to confine gas in the compartment and provide openings through which the liquid phase is accessible to the compartment. Each compartment, therefore, has a gas-liquid interface. The part of the system that is on the left-hand side of the partitioner 56a is the first zone of the system and the part on the right-hand side is the second zone of the system. A quantity of feed gas 61 containing A- and B-components is introduced into the compartmentized block at the top position 58a. As this block moves down through the first zone, the A-component in the gas is absorbed into the circulating C-solvent. When this block reaches the lower end of the first zone 58f, the undissolved gas 62 is removed from this compartment. The gas so removed is a B-enriched gas stream. When this block enters the lower end of the second zone, a quantity of A-enriched gas 63 is introduced into the block so as to balance the net forces of the first and second zone and provide gas spaces and gas-liquid interfaces in the small compartments of the block. As the block moves up through the second zone, A-component is desorbed from the liquid phase and enters the gas spaces to form an A-enriched gas. The A-enriched gas 64 is removed from this block as it reaches the upper end of the second zone. A part of this gas is removed as an A-enriched product gas and the remaining gas is recycled to the lower end of the second zone in the way to be described in connection with FIG. 12.

Each of the systems described so far uses either timing belts or rotating chains. FIG. 10 illustrates a system that uses rotating discs. Referring to the figure, the system comprises of one or two rotating discs 65 which can be rotated around a shaft 66. Many cylindrical compartments 67 are rotatably attached to the rotating discs. The discs are rotated counter-clockwise. Referring to FIG. 10a, the left half and the right half of the system are respectively the first zone and the second zone of the system. The system illustrated is used in a gas absorption operation. It is seen that most of the system is submerged in the solvent phase. A quantity of feed gas is introduced to each conduit as it enters the first zone 68, and undissolved gas is removed from each conduit as it leaves the second zone 69. There is no gas in the conduits at the top position 70.

FIGS. 11a through 11e illustrate various types of compartments that may be used in the process. FIG. 11a shows a system which utilizes longitudinal wave-shaped pieces 75. Each wave-shaped piece has walls at the two ends so that two adjacent pieces form a compartment. The system also has a timing belt 76 and pulleys 77 and two discs in the vicinity of the lower pulley to prevent gas in a compartment from leaving the compartment as it turns around the pulley. FIG. 11b shows a detailed drawing of a part of the system illustrated by FIG. 5. It shows an integrated timing belt 79 provided with longitudinal T-shaped pieces 80 and driven by a timing pulley 81. Two adjacent T-shaped pieces form a compartment that contains a gas space 82, 83. FIG. 11c shows compartments formed by longitudinal short H-shaped pieces 85 attached to a moving belt 87 by pivots 86. It is shown that the lower half of each H-shaped piece is covered at the front end and the back end 84 to form an enclosure to confine gas. FIG. 11d shows a moving belt provided with longitudinal rectangular compartments 88, driven by a pulley 90. It is shown that the upper half of each compartment is covered at the front end and the back end to form an enclosure to confine gas. FIG. 11e illustrates a compartmentized block that may be used in the system illustrated by FIG. 9. It has many hexagonal compartments 91. It is shown that the top half 92 of each compartment is covered at the front end and the back end to form an enclosure to confine gas.

By referring to each of the systems described, the torques to be applied to the driving pulleys or driving gears and the power input needed increases as the difference in the net buoyancy-gravity forces that act on the compartments and the added balancing weights of first zone and the second zone increases. It can be shown that the difference in the net buoyancy-gravity forces depends on the amounts of gas contained in the two zones. When the amounts of gas contained in the two zones are about the same, the net forces are about the same and the power input needed is very small.

In a gas absorption system, the difference in the amounts of gas contained in the two zones increases as the amount of gas dissolved in the liquid increases. For a given feed rate and rate of revolution of the driving mechanism, the difference in the net forces of the two zones increases as the rate of gas dissolution increases and consequently the power input increases. It is noted, however, that the work input for a given amount of gas dissolved does decrease as the gas solubility increases.

For a system used in separating a gas mixture containing at least two components A and B into an A-enriched stream and a B-enriched stream, one may use a recycling scheme illustrated by FIG. 12 to reduce the difference in net forces and reduce the power input needed. Referring to the figure, the system consists of a main processing system and an auxiliary processing system. A solvent and a non-solvent are respectively circulated in the two systems. The main system is used to separate to feed gas and recycle gas into an A-enriched gas of which a part is to be recycled, and a B-enriched gas. The auxiliary system is used to simultaneously depressurize the B-enriched gas and pressurize the recycled A-enriched gas. Referring to the figure, a feed gas $V_0$ is introduced to compartment 73a and a B-enriched gas $V_1$ at a high pressure is removed from compartment 73b. A pressurized A-enriched gas $V_5$ is introduced at compartment 73c and the gas in compartment 73d is removed. A part of this gas $V_2$ is the depressurized A-enriched gas, and the remainder of the gas $V_4$ is introduced in compartment 74a of the auxiliary system and is pressurized and removed from compartment 74b to become pressurized A-enriched gas $V_5$, which is recycled to the main system at compartment 73c. The high pressure B-enriched gas $V_1$ is introduced into compartment 74c and is depressurized and discharged from compartment 74d as the depressurized B-enriched gas. Since the liquid circulated in the auxiliary system is a non-solvent both for A-component and B-component, no substantial gas dissolution takes place. Therefore, $V_4$ and $V_5$ are essentially the same in both amounts and compositions, but differ in pressures. Similarly, $V_1$ and $V_3$ are essentially, the same both in amounts and compositions but differ in pressures. By setting the number of moles of the recycled gas $V_4$ equal to the number of moles of the B-enriched gas $V_1$, the numbers of moles of gases in the first zone and the second zone in the main processing system became equal and the numbers of moles of gases in the first zone and the second zone in the auxiliary processing system become equal. Thus the power input needed for the whole system becomes small.

It is noted that when a non-solvent is used, a system of the present invention may be used to simultaneously pressurize and depressurize about the same number of moles of two gas streams. A system may also be used in transferring suspensoids from a gas stream to a liquid stream in a way similar to the gas absorption operation described.

What we claim are:

1. A process of contacting at least a first gas stream with a liquid phase to produce a second gas stream in a processing system which comprises a first processing zone and a second processing zone, multitude of compartments spaced apart and transmission means for revolving the compartments around a peripheral path; each processing zone having an upper end and a lower end and filled with liquid therein and the upper ends of the two processing zones being respectively communicating with the first gas stream and the second gas stream, each compartment having an imperforate confining wall of a shape to retain a volume of gas therein and an opening at the lower portion of the confining wall for admitting gas and liquid into the compartment, that comprises:

(1) a first step of introducing a quantity of the first gas into a compartment near the upper end of the first processing zone communicating with the first gas stream and moving the compartment downwardly into the liquid and repeating the step successively for each of the successive compartments to form a gas-liquid interface with a volume of retained gas therein, (2) a second step of revolving the compartments in the system downwardly in the first processing zone and upwardly in the second processing zone through the liquid, the compartments in the two processing zones retaining volumes of gas under their confining walls and maintaining gas-liquid interfaces between the retained gas and the liquid phase to provide the desired gas-liquid contact, and (3) a third step of removing gas from a compartment near the upper end of the second processing zone communicating with the second gas stream and repeating the step for each of the successive compartments, the gas removed becoming at least a part of the second gas stream; the net buoyancy-gravity force acting on the compartments of the first processing zone and the net buoyancy-gravity force acting on the compartments of the second processing zone aiding in counterbalancing each other through the transmission means to reduce the power input needed in the system.

2. A process of claim 1, wherein the liquid phase has a substantial affinity with at least one component of the gas stream so that a substantial amount of the gas dissolves in the liquid phase during the downward movement and the upward movement of the compartments.

3. A process of claim 1, wherein the gas stream contains suspensoids, and a substantial amount of the suspensoids is transferred from the gas in each compartment to the liquid phase during the period of downward movement and upward movement of the compartment.

4. A system for contacting at least a first gas stream with a liquid phase to produce a second gas stream that comprises:

(1) a first processing zone and a second processing zone, each processing zone having an upper end and a lower end and containing a quantity of the liquid therein, the upper ends of the two processing zones being respectively communicating with the first gas stream and the second gas stream, (2) multitude of revolving compartments, each compartment having an imperforate confining wall of a shape to retain a volume of gas therein and an opening for admitting gas and liquid in the compartment to form a gas-liquid interface with a volume of retained gas therein, (3) transmission means including an endless member for revolving the compartments through the two processing zones, and consequently through the liquid phase contained therein, first from the upper end toward the lower end in the first processing zone and then from the lower end toward the upper end in the second processing zone, most compartments in the two processing zones being supported in the upright positions in the two zones, retaining volumes of gas under their confining walls and maintaining gas-liquid interfaces between the retained gas and the liquid phase to provide the desired gas-liquid contact, (4) means for admitting a quantity of the first gas to a compartment near the upper end of the first processing zone communicating with the first gas stream and means for removing gas from a compartment near the upper end of the second processing zone communicating with the second gas stream, the gas removed becoming at least a part of the second gas stream; the net buoyancy-gravity force acting on the compartments of the first processing zone and the net buoyancy-gravity force acting on the compartments of the second processing zone aiding in counterbalancing each other through the transmission means to reduce the power input needed in the system.

* * * * *